(12) United States Patent
Kang et al.

(10) Patent No.: US 8,695,811 B2
(45) Date of Patent: Apr. 15, 2014

(54) HYBRID POROUS STRUCTURED MATERIAL, MEMBRANE INCLUDING THE SAME, AND METHOD OF PREPARING HYBRID POROUS STRUCTURE MATERIAL

(75) Inventors: Hyo Kang, Seoul (KR); Sung Soo Han, Gyeonggi-do (KR); Pil Jin Yoo, Seoul (KR); Du Yeol Ryu, Gyeonggi-do (KR); Young Hun Kim, Gyeonggi-do (KR); Seon Ju Yeo, Gyeongsangbuk-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/469,858

(22) Filed: May 11, 2012

(65) Prior Publication Data

US 2013/0112613 A1    May 9, 2013

(30) Foreign Application Priority Data

Nov. 4, 2011    (KR) ................. 10-2011-0114745

(51) Int. Cl.
*B01D 39/00*    (2006.01)
*B01D 39/14*    (2006.01)
*B01D 71/06*    (2006.01)
*B01D 63/00*    (2006.01)
*B01D 65/00*    (2006.01)
*B01D 71/00*    (2006.01)

(52) U.S. Cl.
USPC .............. 210/500.21; 210/500.1; 210/500.25; 210/500.27; 428/357; 428/402

(58) Field of Classification Search
None
See application file for complete search history.

(56) References Cited

U.S. PATENT DOCUMENTS

| 4,105,426 | A | * | 8/1978 | Iler et al. ................... 65/17.3 |
| 6,261,469 | B1 | * | 7/2001 | Zakhidov et al. ............ 216/56 |
| 7,732,015 | B2 | | 6/2010 | Nomura et al. |
| 7,799,839 | B2 | | 9/2010 | Yun et al. |
| 2004/0262790 | A1 | | 12/2004 | Fu et al. |
| 2007/0122716 | A1 | * | 5/2007 | Seo et al. .................. 429/251 |
| 2009/0174117 | A1 | | 7/2009 | Winkler et al. |
| 2009/0283480 | A1 | | 11/2009 | Schadler et al. |
| 2010/0160466 | A1 | | 6/2010 | Elabd et al. |

(Continued)

FOREIGN PATENT DOCUMENTS

KR    100764826 B1    10/2007
KR    100805303 B1    2/2008

(Continued)

OTHER PUBLICATIONS

Wang, Xi-Sen, et al. "Enhancing H2 Uptake by "Close-Packing" Alignment of Open Copper Sites in Metal-Organic Frameworks." Angewandte Chemie International Edition 47.38 (2008): 7263-7266.*

(Continued)

*Primary Examiner* — Lore Jarrett
*Assistant Examiner* — Benjamin J Behrendt
(74) *Attorney, Agent, or Firm* — Harness, Dickey & Pierce, P.L.C.

(57) ABSTRACT

A hybrid porous structured material may include a porous region (that forms a nanopore structure) and a non-porous region. The porous region may form a stacked structure where a plurality of spherical bodies are stacked so as to contact each other in three dimensions. The non-porous region may form a structure that fills a gap between the plurality of spherical bodies of the porous region.

17 Claims, 4 Drawing Sheets

(56) References Cited

U.S. PATENT DOCUMENTS

| | | |
|---|---|---|
| 2010/0326513 A1 | 12/2010 | Lee et al. |
| 2011/0073473 A1 | 3/2011 | Zheng et al. |
| 2013/0072845 A1* | 3/2013 | Tennison et al. ............ 604/5.04 |

FOREIGN PATENT DOCUMENTS

| | | |
|---|---|---|
| KR | 20080113440 A | 12/2008 |
| KR | 20110000966 A | 1/2011 |
| WO | WO 2011070363 A1 * | 6/2011 |

OTHER PUBLICATIONS

Darling, S. B. "Directing the self-assembly of block copolymers." Progress in Polymer Science 32.10 (2007): 1152-1204.*

Jackson, Elizabeth A., and Marc A. Hillmyer. "Nanoporous membranes derived from block copolymers: From drug delivery to water filtration." ACS nano 4.7 (2010): 3548-3553.*

Gates, Byron et al. "Fabrication and Characterization of Porous Membranes with Highly Ordered Three-Dimensional Periodic Structures" Chemistry of Materials vol. 11 Issue: 10, pp. 2827-2836, Published Oct. 1999.

Li, Xianfeng et al. "Ordered Nanoporous Membranes Based on Diblock Copolymers with High Chemical Stability and Tunable Separation Properties" Journal of Materials Chemistry, vol. 20 Issue: 21, pp. 4333-4339, Published: 2010.

Velev, Orlin D et al. "Colloidal Crystals as Templates for Porous Materials" Current Opinion in Colloid & Interface Science, vol. 5, Issue: 1-2, pp. 56-63, Published: 200.

Yang, Xiao-Yu et al. "Hierachically Structured Functional Materials: Synthesis Strategies for Multimodal Porous Networks" Pure and Applied Chemistry, vol. 81, Issue: 12, pp. 2265-2307, PUblished: Nov. 29, 2009.

Schmuhl, Riaan et al. "Nanostructured Ion-Selective MCM48 Membranes" Journal of Sol-Gel Science and Technology, vol. 31, Issue 1-3, pp. 249-252, Published Aug.-Sep. 2004.

Hatton, Benjamin et al. "Assembly of Large-Area, Highly Ordered, Crack-Free Inverse Opal Films" Proceedings of the Natinal Academy of Sciences of the United States of America, vol. 107, Issue: 23, pp. 10354-10359, Published: Jun. 8, 2010.

Take, Hiroyoshi et al. "Preparation and Electronic Properties of Nanoporous Carbon Inverse Opal" Preparation and Electronic Properties of Nanoporous Carbon Inverse Opal, vol. 43, Issue: 7A, pp. 4453-4457, Published: Jul. 2004.

Ge, Jianping et al. "Responsive Photonic Crystals" Angewandte Chemie Int, Ed. 50, 1492 (2011).

Choi, Sung-Wook et al. "Three-Dimensional Scaffolds for Tissue Engineering: The Importance of Uniformity in Pore Size and Structure" Langmuir 26, 19001 (2010).

Shin, Ju-Hwan et al. "Facile Synthesis of TiO2 Inverse Opal Electrodes for Dye-Sensitized Solar Cells" Langmuir 27, 856 (2011).

Yang, Seung Yun et al. "Virus Filtration Membranes Prepared from Nanoporous Block Copolymers with Good Dimensional Stability Under High Pressures and Excellent Solvent Resistance" Advanced Functional Materials, 18, 1371 (2008).

* cited by examiner (a)          (b)          (c)

HYBRID POROUS STRUCTURED MATERIAL, MEMBRANE INCLUDING THE SAME, AND METHOD OF PREPARING HYBRID POROUS STRUCTURE MATERIAL

CROSS-REFERENCE TO RELATED APPLICATION

This application claims priority under 35 U.S.C. §119 to Korean Patent Application No. 10-2011-0114745, filed in the Korean Intellectual Property Office on Nov. 4, 2011, the entire contents of which are incorporated herein by reference.

BACKGROUND

1. Field

A hybrid porous structured material, a membrane including the same, and a method of preparing a hybrid porous structured material are disclosed.

2. Description of the Related Art

A membrane including pores may be used to separate a material of a specific size. Such a membrane may be applied for water treatment by removing pollutants using this property. The types of membranes that may be used for water treatment may be divided into a microfiltration membrane, an ultrafiltration membrane, a nanofiltration membrane, a reverse osmotic membrane, and the like according to the size of the micropores.

The characteristics of a membrane are determined according to the characteristics of the pores formed inside. For example, if the porosity of a membrane is relatively high, then the driving pressure may be decreased, but the physical strength may be reduced accordingly. On the other hand, if the porosity is decreased in order to increase the physical strength of a membrane, then the driving pressure may be increased. Furthermore, the selective separation of a material having a specific size may be enhanced by narrowing the size distribution of the pores formed in a membrane.

SUMMARY

Various embodiments relate to a hybrid porous structured material having a desirable level of mechanical strength while having relatively high pore density per unit area, and including nanopores of a relatively uniform size.

Various embodiments relate to a membrane using the hybrid porous structured material.

Various embodiments relate to a method for preparing the hybrid porous structured material.

According to a non-limiting embodiment, a hybrid porous structured material may include a porous region forming a nanopore structure, and a non-porous region. The porous region is formed of a stacked structure where a plurality of spherical bodies are stacked so as to contact each other in three dimensions. The non-porous region is formed of a structure that fills a gap between the plurality of spherical bodies of the porous region.

The plurality of spherical bodies that form the porous region may have a structure where adjacent spherical bodies contact each other and are interconnected.

The porous region may have porosity of about 1 to about 99 volume %.

The porous region may include an organic porous material, an inorganic porous material, an organic/inorganic hybrid porous material, or a combination thereof.

The organic porous material may include a self-assembling block copolymer, amphiphilic liquid crystal, a metal containing self-assembling molecules, or a combination thereof. The inorganic porous material may include zeolite, a metal oxide, mesoporous carbon, or a combination thereof. The organic/inorganic hybrid porous material may include a metal-organic framework (MOF).

The porous region may include pores with an average size of about 0.1 nm to about 100 nm. The organic porous material may be a self-assembling block copolymer. The self-assembling block copolymer may form a self-assembled structure. The self-assembled structure may include nanopores formed by partially or wholly removing a polymer that forms at least one block of the block copolymer.

The self-assembled structure may be a lamellar structure, a cylindrical structure, a spherical structure, a gyroidal structure, or a combination thereof.

The spherical body may have an average diameter of about 1 nm to about 100 μm.

The spherical body may be stacked as a close-packed structure (e.g., closest packing structure).

The volume of the porous region may be about 1 to about 99 volume % of the entire hybrid porous structured material.

The non-porous region may include an inorganic oxide, a thermoplastic resin, a curable resin, or a combination thereof.

The hybrid porous structured material may have a shape of a membrane having two surfaces facing in the opposite directions and a thickness. The relative area occupied by the porous region in each of the two surfaces may be about 5 to about 99% of the entire surface. The porous region may not be exposed on a side wall of the membrane in the thickness direction.

The thickness of the membrane may be about 10 nm to about 1000 μm.

According to another non-limiting embodiment, a membrane may include the hybrid porous structured material.

The membrane may further include a support layer and may be formed as a composite membrane.

According to yet another non-limiting embodiment, a method for preparing a hybrid porous structured material may include forming a stacked structure where a plurality of spherical shape-body particles for forming macropores are stacked so as to contact each other in three dimensions. A liquid phase material for forming a non-porous region may be injected so as to fill a gap between the plurality of spherical body particles that form the stacked structure, and then curing it to form a non-porous region. The spherical body particles for forming macropores may be dissolved to remove them, thus forming a template having spherical-shaped macropores stacked in a closest packing structure. A self-assembling block copolymer including at least two polymers connected by a covalent bond may be injected into the macropores of the template to form a hybrid structured material. A polymer that forms at least one block of the self-assembling block copolymer in the hybrid structured material is partially or wholly eluted to remove it, thus forming nanopores so as to form a hybrid porous structured material.

The spherical body particles for forming macropores may have an average diameter of about 1 nm to about 100 μm.

The stacked structure may be formed using colloid particles as the spherical body particles for forming macropores. The method may be selected from spin coating, dip coating, sedimentation, a spray method, electrophoresis, a Langmuir-Blodgett (LB) method, a form-guide method, or a combination thereof.

The liquid phase material for forming a non-porous region may be injected so as to fill a gap between the plurality of spherical body particles forming the stacked structure by a method selected from spin coating, capillary filling, dip coating, a spray method, or a combination thereof. The liquid phase material is cured to form a non-porous region.

The solvent used for dissolving and removing the spherical body particles for forming macropores may not dissolve the non-porous region.

The injecting of the self-assembling block copolymer in the macropores of the template may be conducted by a method selected from capillary filling, spin coating, dip coating, spray coating, or a combination thereof.

The nanopores may be formed by etching with a solvent that selectively dissolves a polymer forming at least one block of the self-assembling block copolymer.

DETAILED DESCRIPTION

Figure 1:
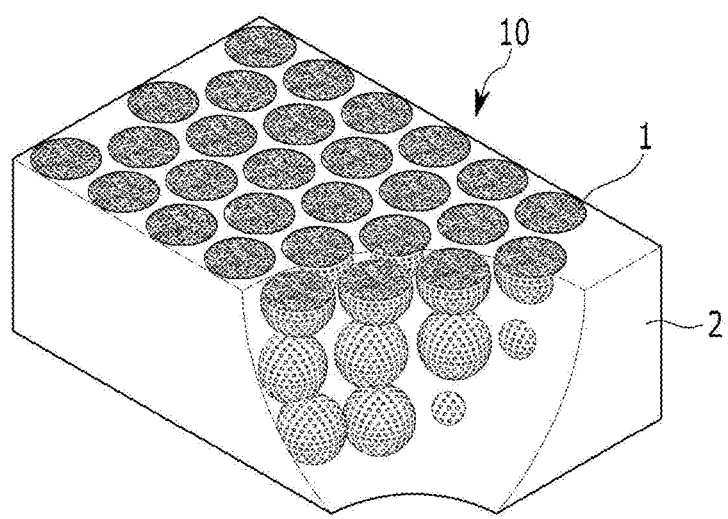
FIG. 1 is a schematic view of a hybrid porous structured material according to a non-limiting embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

This disclosure will be described more fully hereinafter in the following detailed description, in which various embodiments are described. It should be understood that this disclosure may be embodied in many different forms and is not limited to the embodiments set forth herein.

As those skilled in the art would realize, the described embodiments may be modified in various different ways, all without departing from the spirit or scope of this disclosure. For instance, the size and thickness of each constituent element as shown in the drawings may have been exaggerated for a better understanding and ease of description. Thus, this disclosure is not limited to that which is shown in the drawings.

According to a non-limiting embodiment, a hybrid porous structured material forms a hierarchical pore structure that includes a porous region of a stacked structure where a plurality of spherical bodies are stacked so as to contact each other in a three-dimensional direction, and a non-porous region of a structure that fills a gap between the plurality of spherical bodies of the porous region. The hybrid porous structured material may maintain a desirable level of mechanical strength by including the non-porous region, and may secure a relatively high pore ratio in terms of the entire structured material by including the porous region in a relatively high volume ratio. The size of the spherical body that forms a stacked structure of the porous region and the porosity of the porous region may be controlled to attain desirable physical characteristics of the entire hybrid porous structured material.

FIG. 1 is a schematic view of a hybrid porous structured material according to a non-limiting embodiment. In FIG. 1, a porous region 1 forms a stacked structure where a plurality of spherical bodies are stacked so as to contact each other. A non-porous region 2 is formed as a structure that fills a gap between the plurality of spherical bodies, thus forming a hybrid porous structured material 10. The stacked structure may be stacked as a close-packed structure (e.g., closest packing structure). For example, the stacked structure may resemble an opal structure. The opal structure refers to a stacked structure where spherical bodies having a constant size are stacked in a closest packing arrangement. Examples of the closest packing structure may include hexagonal close-packing (hcp) and face-centered cubic (fcc) packing. The plurality of spherical bodies forming the stacked structure may have a structure where adjacent spherical bodies contact each other and are interconnected.

According to another non-limiting embodiment, a hybrid porous structured material may be provided that includes a porous region resembling an opal structure and a non-porous region resembling an inverse-opal structure.

The porous region 1 may be formed of any known suitable material without limitation. The porosity of the porous region may be about 1 to about 99%.

Examples of the material that may form the porous region may include an organic porous material, an inorganic porous material, an organic/inorganic hybrid porous material, and a combination thereof.

Examples of the inorganic porous material that may form the porous region may include zeolite, a metal oxide such as silica and the like, and mesoporous carbon and the like. Examples of the organic/inorganic hybrid porous material that may form the porous region may be formed as a metal-organic composite framework (MOF). Materials including nanopores formed in the particles may be used as a material of the porous region. The nanopores may have an average size of about 0.1 nm to about 1000 nm, for example about 1 nm to about 500 nm, or about 10 nm to about 100 nm.

The organic porous material that may form the porous region may be, for example, a self-assembling block copolymer. The porous region formed of the self-assembling block copolymer may have a self-assembled structure including pores formed by partial or complete removal of a polymer that forms at least one block. The produced pores may have a complicated structure such as a tube shape and the like instead of a spherical shape, and the tube-shaped nanopores may have an average diameter of about 0.1 nm to about 100 nm.

The self-assembling block copolymer has a morphology where one end of at least two kinds of polymers are connected by a covalent bond or a chemical bond. The self-assembling block copolymer may be a material that forms a thermodynamically stable nanostructure by microphase separation due to non-compatibility of each block. The self-assembling block copolymer forming the porous region may include any block copolymer known to be capable of forming the relatively fine nanostructure, without limitations. As used herein, the relatively fine nanostructure formed by the self-assembling block copolymer is referred to as a self-assembled structure. The volume ratio of the blocks of the self-assembling block copolymer and the molecular weight and the like may be controlled to form various self-assembled structures. Examples of the self-assembled structure may include a lamellar structure, a cylindrical structure, a spherical structure, a gyroidal structure, and the like.

The self-assembled structure formed by the self-assembling block copolymer may form the porous region by partially or wholly removing the polymer that forms at least one block, thus forming pores previously occupied by the removed polymer. The pores may be prepared using a solvent that selectively dissolves a specific polymer included in the self-assembling block copolymer.

Another example of the organic porous material forming the porous region may include an organic material of a hybrid single molecule or a hybrid small molecule capable of self-assembly. Specifically, a liquid crystal as an amphiphilic small molecule, or a metal-containing single molecule or small molecule material such as metallocene may be used. In addition, a single molecule or small molecule material that may be self-assembled through a hydrogen bond, metal coordination, a hydrophobic bond, a Van der Waals bond, a pi-pi interaction, and an electrostatic effect may be used. After forming the nano-structure from the hybrid material that may be self assembled, a part of the hybrid material may be removed to form a porous region forming the nanopore structure.

The self-assembled structure formed from a block copolymer and the like may be a nanostructure produced by microphase separation due to chemical/physical differences between the different kinds of monomers or materials therein. For example, a part of the monomers and/or materials may be removed to form a porous structure of the nanostructure. Since the hybrid porous structured material includes such a porous structure of the nanostructure, it may be effectively applied particularly for biofiltration for water treatment that may selectively separate particles of a specific size as well as for a membrane material for a nanofiltration membrane and an ultrafiltration membrane.

To apply the hybrid porous structured material for a membrane and the like, the physical characteristics should be controlled, and the pore structure of the porous region should be relatively uniform in order to allow adequate control the physical characteristics. Since the self-assembled structure may be controlled with relative ease by controlling the molecular weight of the self-assembling block copolymer, the content ratio of polymers forming each block, and the like, and designed so as to have a relatively uniform nanostructure of a desired size, a porous region including a porous structure of a uniform nanostructure may be formed with relative ease in the self-assembled structure by partially or wholly removing at least one block to form the pores. As previously explained, the self-assembling block copolymer may form a porous structure of a relatively uniform nanostructure, and the manufacturing process is relatively simple. Thus, the self-assembling block copolymer may be relatively useful as a material for forming the porous region of the hybrid porous structured material.

In order for the hybrid porous structured material to be usefully applied for a membrane, it should have a relatively uniform nanopore structure. At the same time, the pore density per unit area of the entire hybrid porous structure material should be relatively high. If the pore density per unit area of the entire hybrid porous structured material is relatively high, then the effective function of the membrane may be expected even under a relatively low applied pressure. As explained, a porous structure of a uniform nanostructure may be formed using the self-assembling block copolymer, and the pore density per unit area of the entire hybrid porous structured material may be increased by forming the porous region as a stacked structure where a plurality of spherical bodies contact each other in three dimensions. In the hybrid porous structured material, the volume of the porous region may be about 1 to about 99 volume % of the entire hybrid porous structured material. For example, in the hybrid porous structured material, the volume ratio of the porous region may be about 25 to about 90 volume % of the entire hybrid porous structured material. In another example, the volume ratio of the porous region may be about 50 to about 75 volume % of the entire hybrid porous structured material.

When the size distribution of the spherical bodies forming the stacked structure is narrow or the stacked structure is formed only with almost uniform spherical bodies, the pore density of the entire hybrid porous structured material per unit area may be increased while maintaining a desirable level of mechanical strength. Meanwhile, the size of the spherical bodies forming the stacked structure may be varied according to the volume ratio of the porous region and the non-porous region, and water permeability of the membrane to be manufactured. For example, the spherical bodies may be sequentially stacked with decreasing or increasing size.

Pore density of the entire hybrid porous structured material per unit area may be controlled by controlling the size of the spherical bodies constituting the stacked structure in the porous region of a stacked structure where a plurality of spherical bodies are stacked so as to contact each other in three dimensions. For example, the spherical bodies constituting the stacked structure may have an average diameter of about 1 nm to about 100 μm, or about 10 nm to about 10 μm. In another example, it may have an average diameter of about 100 nm to about 1 μm. The hybrid porous structured material may be used for a membrane having a relatively high pore density per unit area by forming the porous region of a stacked structure of spherical bodies having the above size range so as to have the above porosity range.

In the porous region, each spherical body may be three-dimensionally connected by forming a stacked structure of a plurality of spherical bodies that contact each other and are interconnected. Due to the properties of the three-dimensional connection structure, compensation for defects may be automatically made and thus when applied to a membrane, a desirable effect of separating a target material of a specific size may be exhibited.

The non-porous region may improve mechanical characteristics of the hybrid porous structured material. For example, in a membrane for water treatment, the non-porous region may have an average pore size in the range of about 1 to about 30 Å. If used as a selective membrane for a gas such as $CO_2$, the non-porous characteristic may be reinforced so as to have a smaller pore size range. That is, a pore size that embodies the non-porous characteristic may be varied according to the use of the membrane. As explained, the hybrid porous structured material is formed as a hybrid structure material including a hierarchical pore structure by simultaneously including a porous region of a stacked structure of spherical bodies and a non-porous region that fills a gap of the porous region.

As the material forming the non-porous region, any non-porous material that may maintain adequate mechanical strength of the hybrid porous structured material to a desired degree and that may be applied to the following preparation method may be used without limitation. According to the following method of preparing a hybrid porous structured material, a three-dimensional stacked structure may be prepared with colloid particles, and a non-porous region is formed so as to fill the gap between the colloid particles. Then, the stacked structure of the colloid particles is removed to form a template containing macropores of the non-porous region. The non-porous region may not be removed during the process of removing the stacked structure of colloid particles, and it may not be removed during the process of forming micropores of the porous region. Any material may be used without limitation as long as it satisfies these conditions for the preparation process: the material has a non-porous characteristic suitable for use, and has a desirable level of (or, alternatively, a predetermined level of) mechanical strength.

For example, a material forming the non-porous region may be an inorganic oxide, a thermoplastic resin, a curable resin, and the like.

Specific examples of the inorganic oxide that may be used as a material forming the non-porous region may include titanium oxide, tin oxide, lead oxide, zirconium oxide, nickel oxide, copper oxide, yttrium oxide, magnesium oxide, calcium oxide, aluminum oxide, boron oxide, silicon oxide, zeolite, and the like. A solution including a precursor of the inorganic oxide may be injected so as to fill a gap between a plurality of spherical bodies forming the stacked structure and then cured by sol gel reaction to form a non-porous region.

Specific example of the thermoplastic resin that may be used as a material for forming the non-porous region may include polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylene fluoride, polyvinyl chloride, cellulose acetate, cellulose diacetate, cellulose triacetate, and the like.

The curable resin that may be used as a material forming the non-porous region may be selected from a thermosetting resin, a photocurable resin, and a combination thereof. As the thermosetting resin and the photocurable resin, any suitable resin known as a thermosetting resin or photocurable resin may be used without limitation. Specifically, a thermosetting resin such as polydimethylsiloxane (PDMS) or a photocurable resin that may be cured by electromagnetic waves such as an UV curable resin may be used. Specific examples of the UV curable resin may include a polyurethane-based, a polyacrylate-based, a polyepoxy-based, a polyurethaneacrylate-based, a polyesteracrylate-based, a polyepoxyacrylate-based, and a silicon-based UV curable resin, and the like.

A thermoplastic resin mixed with a solvent or a curable resin mixed with a solvent, or a liquid phase thermoplastic resin or a liquid phase curable resin of a molten state, may be injected so as to fill a gap between a plurality of spherical bodies forming the stacked structure, and then dried, cooled, or cured to form a non-porous region.

The hybrid porous structured material may be formed of materials constituting a hybrid porous hierarchical structure as explained above. The hybrid porous structured material may effectively perform even under a relatively low driving applied pressure and has a desirable level of mechanical stability. Thus, the hybrid porous structured material may be usefully applied as a material for the next generation membrane for water treatment Furthermore, the hybrid porous structured material may selectively separate nanobodies or environmental materials, and thus it may be applied for sewage/waste water treatment, food processing, oil separation, and the like.

The hybrid porous structured material may be formed as a membrane having two surfaces facing in the opposite directions and a thickness. A relative area occupied by the porous region in each of the two surfaces is about 5 to about 99% of the entire surface. The porous region may not be exposed on a side wall of the membrane, wherein the side wall extends in the thickness direction. For example, the relative area occupied by the porous region in each of the two surfaces may be about 25 to about 90% of the entire surface, or about 50 to about 80%.

The hybrid porous structured material may be formed as a membrane having a thickness of about 10 nm to about 1000 μm. If the thickness of the membrane is increased, the mechanical strength may be increased, but a relatively high applied pressure may accordingly be required. As such, the thickness of the membrane may be controlled so as to have a desired characteristic according to the use of the membrane. For example, the membrane may have a thickness of about 100 nm to about 500 µm. As another example, the membrane may have a thickness of about 1000 nm to about 250 µm.

According to yet another non-limiting embodiment, a membrane including the hybrid porous structured material is provided.

The membrane may be manufactured into a microfiltration (MF) membrane, an ultrafiltration (UF) membrane, a nanofiltration (NF) membrane, a reverse osmosis (RO) membrane, a forward osmosis (FO) membrane, and the like, by controlling the nanopore structure of the porous region according to use.

The membrane may be manufactured into a single membrane or a composite membrane further including a heterogenous material membrane. For example, the membrane may be a single membrane formed of the hybrid porous structured material (hereinafter referred to as a "hybrid porous structured material membrane"). If the membrane is a composite membrane, it may be, for example, a composite membrane including a support layer bonded to the hybrid porous structured material membrane. The shape and kind of the support layer are not specifically limited, and a layer formed by a known method using a known material may be used.

If the membrane is a composite membrane, the thickness of the hybrid porous membrane may be as explained above, and the thickness of the support layer may be about 200 µm to about 500 µm, for example about 100 µm to about 250 µm, or about 50 µm to about 125 µm.

The support layer may be manufactured according to whether a membrane to be manufactured is a microfiltration (MF) membrane, an ultrafiltration (UF) membrane, a nanofiltration (NF) membrane, a reverse osmosis (RO) membrane, or a forward osmosis (FO) membrane. The support layer may be manufactured by including one selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, a polyacrylonitrile-based compound, a polysulfone-based compound, cellulose-based compound, polyvinylidene fluoride (PVDF), polytetrafluoroethylene (PTFE), a polyvinyl chloride (PVC) compound, or a combination thereof.

Figure 2:
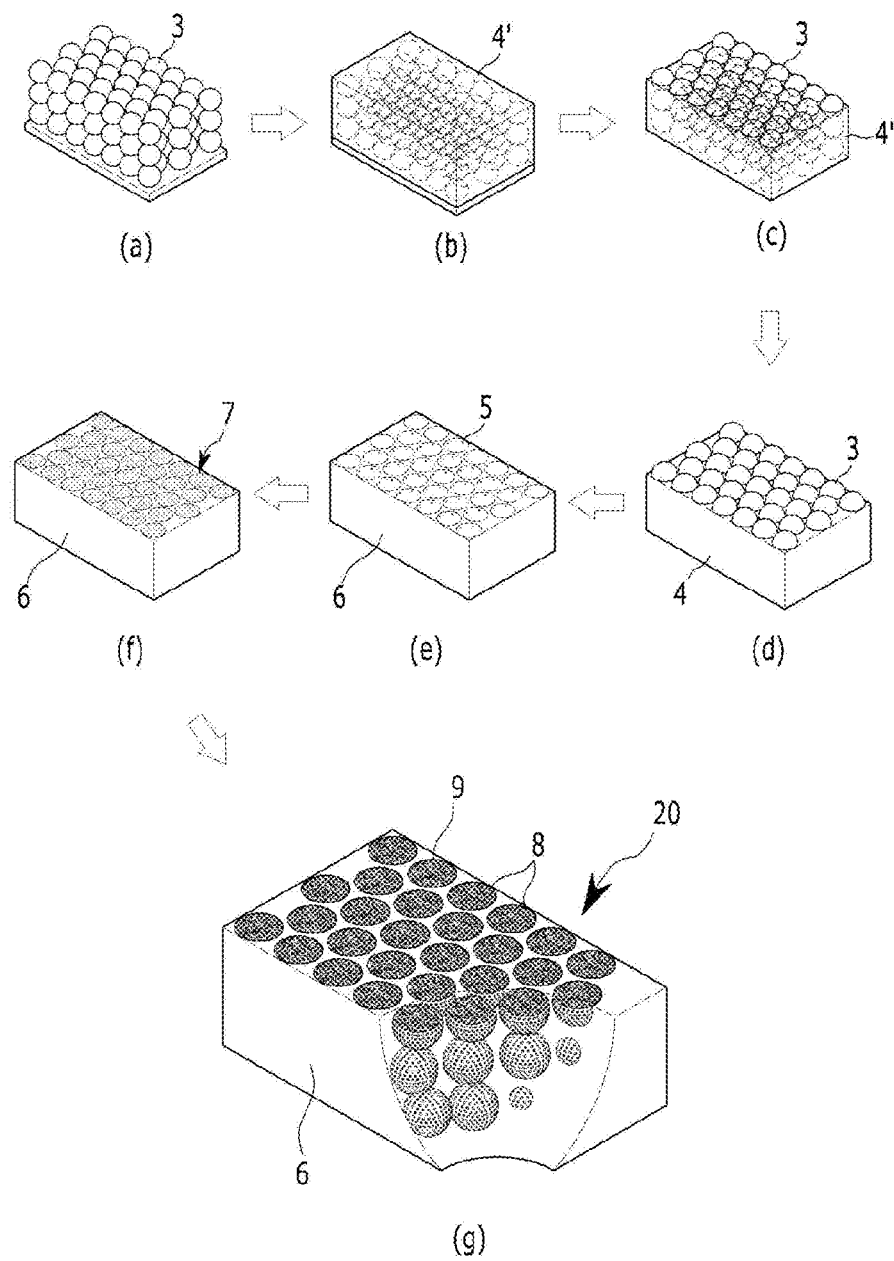
FIG. 2 is a schematic view of a method of preparing a hybrid porous structured material according to a non-limiting embodiment.

Hereinafter, a preparation method of the hybrid porous structured material will be explained. The method for preparing the hybrid porous structured material may include forming a stacked structure where a plurality of spherical body particles for forming macropores are stacked so as to contact each other in three dimensions; injecting a liquid phase material for forming a non-porous region so as to fill a gap between the plurality of spherical body particles forming the stacked structure, and then curing it to form a non-porous region; dissolving the spherical body particles for forming macropores to remove them, thus forming a template having spherical-shaped macropores stacked in a closest packing structure; injecting a self-assembling block copolymer including at least two polymers connected by a covalent bond in the macropores of the template to form a hybrid structured material; and partially or wholly eluting a polymer forming at least one block of the self-assembling block copolymer in the hybrid structured material to remove it, thus forming nanopores to form a hybrid porous structured material. FIG. 2 is a schematic view of a method of preparing a hybrid porous structured material according to a non-limiting embodiment.

First, a stacked structure is formed, wherein spherical body particles 3 for forming macropores are stacked so as to contact each other in three dimensions. In FIG. 2(*a*), a stacked structure is formed so as to resemble an opal structure of spherical body particles 3 for forming macropores. As explained, the size of the spherical body particles 3 may be determined according to pore density per unit area of the hybrid porous structured material 20 to be ultimately obtained. For example, the average diameter of the spherical body particles 3 may be about 1 nm to about 100 µm, for example about 10 nm to about 10 µm, or about 100 nm to about 1 µm. The spherical body particles 3 and the shape of the stacked structure may be as previously explained for the shape of the porous region of the hybrid porous structured material. For example, the spherical body particles 3 may be arranged to resemble an opal structure while having the above size range.

As the spherical body particles 3 for forming macropores, any suitable material that may be selectively removed by etching after forming a non-porous region 4 may be used without limitation. For example, for a relatively small size deviation between the spherical body particles 3, colloid particles may be used as the spherical body particles 3. For example, an opal structure of colloid particles having a crystal lattice may be formed by spin coating, dip coating, sedimentation, a spray method, a coating method using external stimulation such as electrophoresis and the like, a Langmuir-Blodgett (LB) method, a form-guide method, and the like, or using inorganic colloid particles such as $SiO_2$ or organic colloid particles such as polystyrene (PS) and polymethylmetacrylate (PMMA).

A liquid phase material 4' for forming a non-porous region is injected so as to completely fill the gap between the spherical body particles 3 of the stacked structure, thereby forming a structure (FIG. 2(*b*)). The liquid phase material 4' for forming a non-porous region may include a thermoplastic resin, a curable resin, or an inorganic oxide precursor solution. The detailed description thereof may be as previously explained in connection with the non-porous region included in the hybrid porous structured material. A method for injecting the liquid phase material 4' for forming a non-porous region may include spin coating, capillary filling, dip coating, a spray method, and the like, but is not limited thereto.

To manufacture a hybrid porous structured material 20 as a free-standing thin film type with both sides of the film open and exposed, before the material 4' for forming a non-porous region is cured to form a non-porous region 4, a part of the material 4' for forming a non-porous region is removed so that the spherical body particles 3 may be exposed on the surface, thus exposing the porous region 9 on both sides of the thin film (FIG. 2(*c*)). Subsequently, the liquid phase material 4' for forming a non-porous region is cured to form a non-porous region 4 (FIG. 2(*d*)). The degree of exposure of the spherical body particles 3 may be controlled such that a relative area occupied by the porous region 9 on one surface of the thin film may be about 5 to about 99%, for example about 25 to about 90%, or about 50 to about 80% of the entire area.

Subsequently, the spherical body particles 3 are removed using a solvent that may selectively dissolve them for removal, to form a template 6 containing macropores of a three-dimensional stacked structure previously occupied by the spherical body particles 3 (FIG. 2(*e*)). In FIG. 2(*e*), the relatively small points shown in the macropores 5 indicate that the macropores 5 are interconnected. For example, if the spherical body particles 3 are inorganic oxide colloid particles such as SiO$_2$, then they may be removed using hydrofluoric acid (HF). On the other hand, if the spherical body particles 3 are organic colloid particles such as polystyrene, then they may be removed using an organic solvent such as toluene and the like. The size of the lattice structure of the macropores of a stacked structure and the size of pores in the connection part between the lattices may be controlled according to the kind and size of the colloid particle used as the spherical body particles 3.

A self-assembling block copolymer is injected in the macropores 5 of the template 6 containing the macropores 5 to form a self-assembled structure 7 (FIG. 2(f)). Subsequently, a polymer that forms at least one block in the self-assembling block copolymer is partially or wholly eluted and removed to form a nanopore structure 8, thus obtaining a hybrid porous structured material 20 having a hierarchical pore structure (FIG. 2(g)).

The injection of the self-assembling block copolymer in the macropores 5 of the template 6 containing the macropores 5 may be conducted by penetrating a molten liquid or diluted solution of the self-assembling block copolymer in the macropores 5 by, for example, capillary filling, spin coating, dip coating, spray coating, and the like. Subsequently, the molten liquid or diluted solution of the self-assembling block copolymer may be solidified (to form a self-assembled structure 7) to coat the internal surface of the macropores 5 with the self-assembling block copolymer of a self-assembled structure 7. A molten liquid or diluted solution of the self-assembling block copolymer may be used according to the injection method of the self-assembling block copolymer.

To partially or wholly elute a polymer forming at least one block of the self-assembling block copolymer and remove it, etching may be conducted using a solvent that selectively dissolves a polymer forming at least one block of the self-assembling block copolymer. By forming a porous region 9 in the macropores 5 of the template 6 containing the macropores, a hybrid porous structured material 20 including a non-porous region 4 and a porous region 9 may be obtained.

As explained, since the method for preparing the hybrid porous structured material 20 first involves forming a template 6 containing macropores and then injecting a material forming a nanopore structure 8 in the macropores 5, it may be applied with relative ease for a relatively large area processing and industrial processing of a thickness of dozens of micrometers.

Hereinafter, the non-limiting embodiments are illustrated in more detail with reference to various examples. However, the following are example embodiments and are not limiting.

EXAMPLE

Example 1

First, an opal structure of a relatively highly crystallized lattice shape is formed by sedimentation using polystyrene nanoparticles of a size of 500 nm. Polyurethaneacrylate is injected into the opal structure by spin coating (7500 rpm, 5 min.). To manufacture a free-standing thin film shape with both sides of the inverse-opal structure thin film open, polyurethaneacrylate that exists on the surface in an excessive amount is removed by spin coating (7500 rpm, 30 sec.) of ethanol (10 v/v %, distilled water), and the surface is planarized. Subsequently, a polyurethaneacrylate non-porous region of an inverse-opal structure is manufactured through curing for 2 hours under an ultraviolet (UV) exposure condition, and then inner polystyrene is removed by supporting in toluene for 4 hours. A diluted solution of polystyrene-polymethylmethacrylate block copolymer (PS-b-PMMA, PS volume ratio (volume fraction) is 80 volume %) having a phase separation of a cylinder shape is injected into the inverse-opal template, and then the solvent is gasified to form a thin film of the block copolymer inside, and heat treatment is conducted at 200° C. for 12 hours under vacuum to induce nanophase separation of the cylinder shape. Subsequently, the polymethylmethacrylate chain is decomposed through ultraviolet (UV) light irradiation under vacuum for 12 hours, and then the decomposed polymethylmethacrylate is eluted using acetic acid to form a porous region including nanopores, thereby preparing a hybrid porous structured material.

Figure 3:
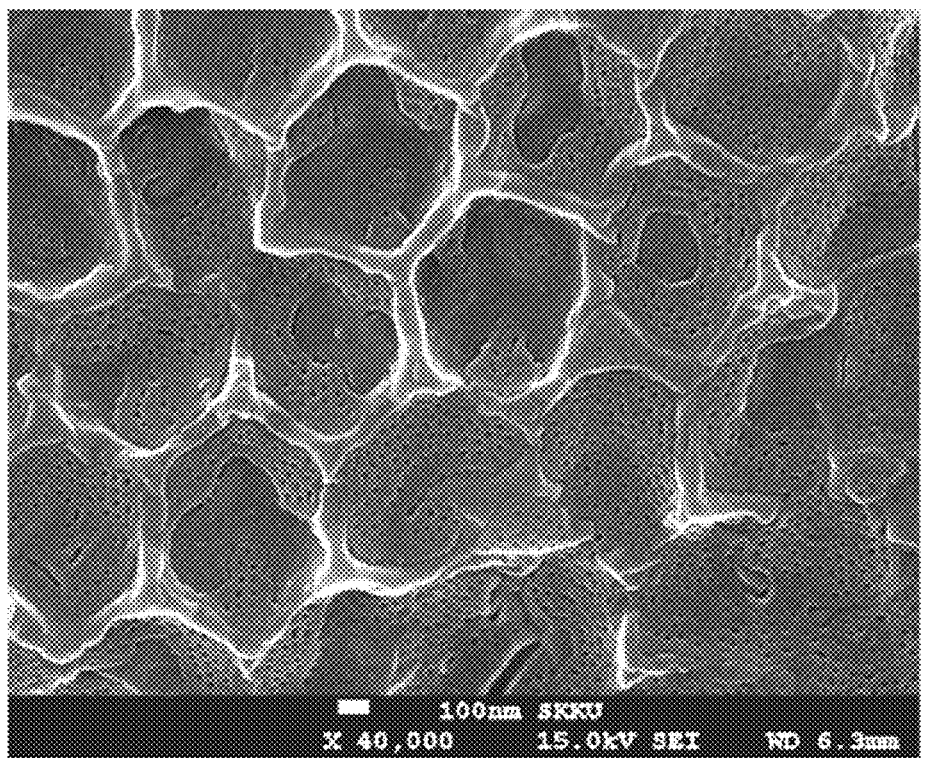
FIG. 3 is a scanning electron microscope (SEM) photograph of a cross-section of a hybrid porous structured material according to a non-limiting embodiment.

FIG. 3 is a scanning electron microscope (SEM) photograph of a cross-section of a hybrid porous structured material according to a non-limiting embodiment.

Example 2

A support layer (0.45 μm) is bonded to the hybrid porous structured material membrane (25 μm) prepared in Example 1 to manufacture a membrane of an ultrafiltration (UF) membrane.

Comparative Example 1

First, an opal structure of a relatively highly crystallized lattice shape is formed by sedimentation using polystyrene nanoparticles with a size of 500 nm. Polyurethaneacrylate is injected into the opal structure by spin coating (7500 rpm, 5 min.). To manufacture a free-standing thin film shape with both sides of the inverse-opal structure thin film open, polyurethaneacrylate existing on the surface in an excessive amount is removed by spin coating (7500 rpm, 30 sec.) of ethanol (10 v/v %, distilled water), and the surface is planarized. Subsequently, a polyurethaneacrylate non-porous region of an inverse-opal shape is made through curing for 2 hours under an ultraviolet (UV) exposure condition, and then inner polystyrene is removed by supporting in toluene for 4 hours, to manufacture an inverse-opal shaped polyurethaneacrylate membrane including macropores.

Experimental Example 1

Evaluation of Membrane Performance

To evaluate membrane performance of the membranes manufactured in the Example 2 and Comparative Example 1, a feed solution is passed and the degree of purification is evaluated.

As the feed solution, an aqueous solution of 0.1 wt % silica nanoparticles (30 nm) is prepared. The silica nanoparticles are synthesized as follows.

1.5 ml of ammonium hydroxide and 0.5 ml of distilled water are added to 23 ml of ethanol, and they are mixed (solution A). In another container, 2 ml of tetraethylorthosilicate (TEOS) is mixed with 3 ml of ethanol (solution B). Then, while agitating solution A, solution B is dropped using a spoid, and they are mixed. After agitating for 1 hour, the mixture is sonicated for 10 minutes using an ultrasonicator, and then nanoparticles are precipitated on the lower layer and concentrated using a centrifuge (5000 rpm, 10 min.), and the supernatant is removed. The concentrate is then redispersed using ethanol with an ultrasonicator, and then a concentration process with a centrifuge is repeated several times to prepare silica nanoparticles.

To evaluate membrane performance, an aqueous solution of 0.1 wt % silica nanoparticles (30 nm) is prepared using the prepared silica nanoparticles.

While injecting the aqueous solution of 0.1 wt % silica nanoparticles (30 nm) at a speed of 0.3 ml per minute using a syringe pump that pushes at a constant pressure of 9 kg/cm2, the separation characteristic of each membrane manufactured in Example 2 and Comparative Example 1 is confirmed and a treated water solution is obtained.

Figure 4:
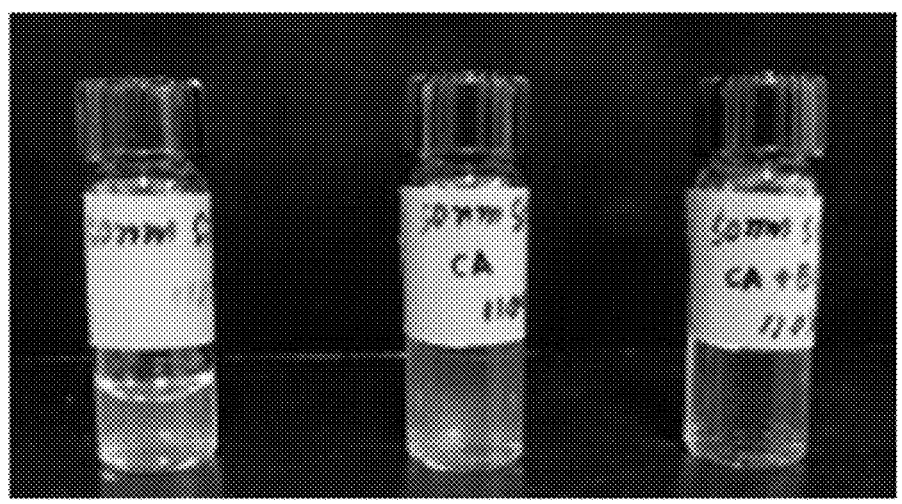
FIG. 4 shows photographs of treated water obtained by filtering an aqueous solution of silica nanoparticles with membranes manufactured according to an example and a comparative example.

FIG. 4(a) is a photograph of an aqueous solution (feed solution) of 0.1 wt % silica nanoparticles (30 nm), FIG. 4(b) is a photograph of treated water having passed through the membrane of Comparative Example 1, and FIG. 4(c) is a photograph of treated water having passed through the membrane of Example 2. It can be seen that the treated water of Example 2 is more transparent than the treated water of Comparative Example 1, thus confirming that the membrane of Example 2 has a better performance.

While this disclosure has been described in connection with various example embodiments, it is to be understood that the disclosure is not limited to the disclosed embodiments, but, on the contrary, is intended to cover a variety of modifications and equivalent arrangements included within the spirit and scope of the appended claims.

DESCRIPTION OF SYMBOLS

1: porous region
2: non-porous region
3: spherical body particle for forming macropores
4: non-porous region
4': liquid phase material for forming a non-porous region
5: macropores
6: template containing macropores
7: self-assembled structure
8: nanopore structure
9: porous region
10: hybrid porous structured material
20: hybrid porous structured material

What is claimed is:

1. A hybrid porous structured material comprising:
a porous region including a plurality of spherical bodies stacked so as to contact each other in three dimensions with gaps between non-contacting surfaces of the plurality of spherical bodies, each of the plurality of spherical bodies having nanopores; and
a non-porous region filling the gaps between the non-contacting surfaces of the plurality of spherical bodies of the porous region,
wherein the porous region includes an organic porous material, and the organic porous material is a self-assembling block copolymer, an amphiphilic liquid crystal, a metal containing self-assembling molecules, or a combination thereof.

2. The hybrid porous structured material of claim 1, wherein the plurality of spherical bodies include adjacent spherical bodies that are interconnected.

3. The hybrid porous structured material of claim 1, wherein the porous region has a porosity of about 1 to about 99 volume %.

4. The hybrid porous structured material of claim 1, wherein the nanopores have an average size of about 0.1 nm to about 100 nm.

5. The hybrid porous structured material of claim 1, wherein
the organic porous material is a self-assembling block copolymer,
the self-assembling block copolymer is in a form of a self-assembled structure, and
the self-assembled structure includes the nanopores, the nanopores resulting from a partial or complete removal of a polymer that forms at least one block of the block copolymer.

6. The hybrid porous structured material of claim 5, wherein the self-assembled structure is a lamellar structure, a cylindrical structure, a spherical structure, a gyroidal structure, or a combination thereof.

7. The hybrid porous structured material of claim 1, wherein the plurality of spherical bodies have an average diameter of about 1 nm to about 100 μm.

8. The hybrid porous structured material of claim 1, wherein the plurality of spherical bodies are stacked as a close-packed structure.

9. The hybrid porous structured material of claim 8, wherein the close-packed structure is a face-centered cubic (fcc) close-packed structure.

10. The hybrid porous structured material of claim 8, wherein the close-packed structure is a hexagonal close-packed (hcp) structure.

11. The hybrid porous structured material of claim 1, wherein a volume of the porous region is about 1 to about 99 volume % of a total volume of the hybrid porous structured material.

12. The hybrid porous structured material of claim 1, wherein the non-porous region includes an inorganic oxide, a thermoplastic resin, a curable resin, or a combination thereof.

13. The hybrid porous structured material of claim 1, wherein
the hybrid porous structured material has a thickness, a first surface, an opposing second surface, and side surfaces between the first surface and the second surface, the thickness being a distance between the first surface and the second surface,
an area of the porous region in each of the first and second surfaces is about 5 to about 99% of a total area of each of the first and second surfaces, and
the porous region is not exposed on the side surfaces.

14. The hybrid porous structured material of claim 13, wherein the thickness is about 10 nm to about 1000 μm.

15. A membrane comprising the hybrid porous structured material of claim 1.

16. A composite membrane comprising:
the membrane of claim 15; and
a support layer.

17. A hybrid porous structured material comprising:
a porous region including a plurality of spherical bodies stacked so as to contact each other in three dimensions with gaps between non-contacting surfaces of the plurality of spherical bodies, each of the plurality of spherical bodies having nanopores; and
a non-porous region filling the gaps between the non-contacting surfaces of the plurality of spherical bodies of the porous region,
wherein the porous region includes an organic porous material, the organic porous material is a polymeric material, and the non-porous region includes a thermoplastic resin, a curable resin, or a combination thereof.

* * * * *